Figure 1:
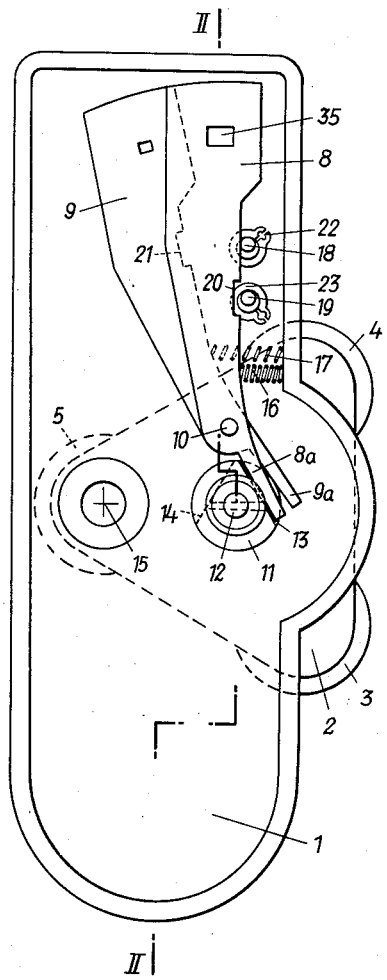

Jan. 23, 1962    E. KEZNICKL    3,017,815
CAMERA, MORE PARTICULARLY SUBSTANDARD FILM CAMERA
Filed Feb. 17, 1960    2 Sheets-Sheet 1

United States Patent Office 3,017,815
Patented Jan. 23, 1962

3,017,815
CAMERA, MORE PARTICULARLY SUBSTANDARD FILM CAMERA
Eduard Keznickl, Vienna, Austria, assignor to Alois Handler and Karl Vockenhuber, both of Vienna, Austria
Filed Feb. 17, 1960, Ser. No. 9,292
5 Claims. (Cl. 95—44)

The invention relates to a camera, more particularly substandard film camera, comprising at least one movable, preferably revolving carrier for the objectives and supplementary objectives respectively of the camera, further comprising a viewfinder, in the path of rays through which masks can be inserted, which are positively controlled by moving the objective carrier, indicating in the viewfinder the field of view of the respective objective, being in operating position.

With respect to cameras of this kind difficulties resulted, because it was hard to attain the exact adjustment of the masks being inserted in the path of rays of the viewfinder. By small deviation of measure on manufacturing the viewfinder masks and the corresponding coupling elements with the movable objective carrier respectively errors arose in the indication of the picture limitation, which hardly could be corrected.

According to the invention the disadvantages of the known embodiment are avoided by the fact that each of the viewfinder masks during their operating position adjoin one adjustable stop by spring tension, being swingable out of the path of rays of the viewfinder against the spring tension by controlling curves or the like connected with the objective carrier. By this measure eventual inaccuracies in the coupling device between viewfinder masks and objective carrier, especially deviations in the shape of the controlling curve or the like do not influence the viewfinder, because the position of the masks is determined by stops being adjustable after mounting, whereas the coupling with the objective turret is only operative on moving the masks out of the path of rays of the viewfinder.

Preferably in a camera with revolving objective or supplementary objective turret the viewfinder masks are constructed lever-like, being mounted at a common axle, running parallel to the turret axle, the viewfinder masks being swingable out of their operating position by cam discs connected with the objective turret, co-operating with a lever-arm of the viewfinder masks.

The stops can be adjustable for example by screws; it is also possible to construct the stop itself as a screw pin, blocking it after adjustment in its position.

A simpler and also more useful arrangement, however, results, when constructing according to a further feature of the invention the adjustable stops as eccentric arranged pins or the like, running normally to the direction of movement of the viewfinder masks. These pins are secured against rotation as known after adjustment of the stops.

The invention is diagrammatically illustrated in the accompanying drawing with reference to an embodiment shown by way of example.

Figure 2:
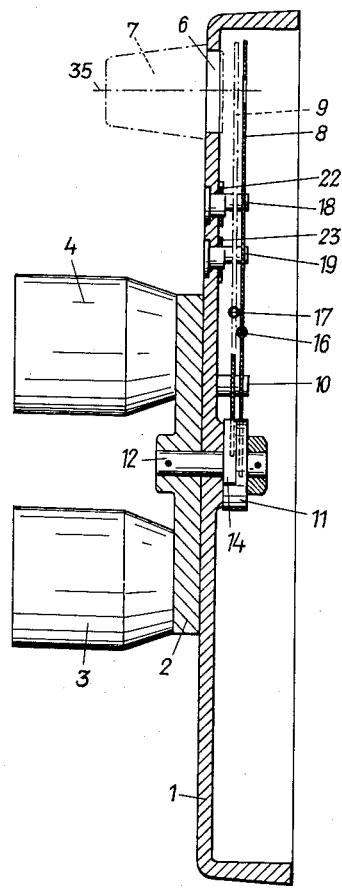
Figure 3:
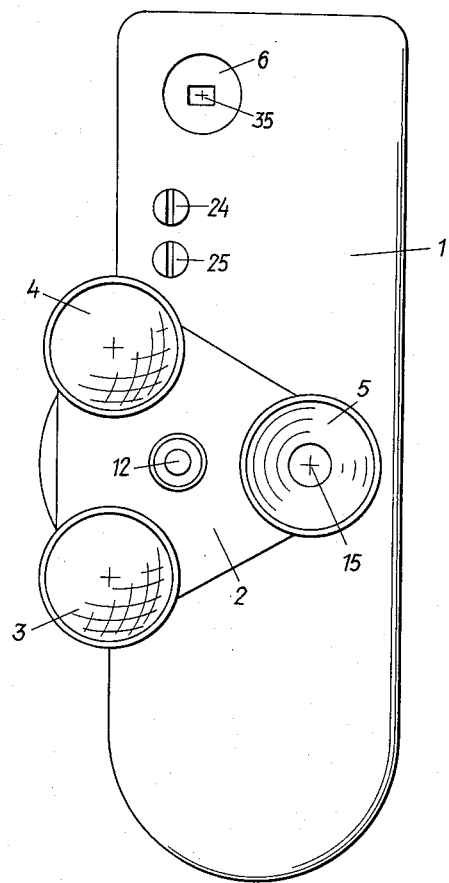

FIG. 1 is a rear view of the front cap of a 8 mm. substandard film camera. FIG. 2 shows a section according to the plane II—II in FIG. 1. FIG. 3 is the front view of the same front cap.

At the front plate 1 of the casing of a 8. mm. film camera a supplementary objective turret is pivotally mounted, carrying a telephoto supplementary objective 3 and a wide angle supplementary objective 4. At the supplementary objective turret 2 further a sun shield 5 for the normal objective of the camera is arranged, the latter being fixed at the camera body not shown in the drawing. The optical axis of the normal objective is marked with 15. The viewfinder objective 7 can be inserted into the boring 6 of the front cap, the first being illustrated in FIG. 2 in dashed lines. The optical axis of the viewfinder is marked with 35. In the viewfinder objective a mask is mounted, indicating the picture limitation for the wideangle shot. The masks 8, 9 for shooting with the normal or telephoto objective respectively are swingably mounted at a common pivot pin 10. The masks 8, 9 are controlled by a trigger cam 11, which is fixed at the axle 12 of the turret, being turned by adjustment of the supplementary objective turret 2. The trigger cam 11 is formed in the main cylindrically with two flats 13, 14, at which the flat 13 is situated in the range of the extension 8a of the viewfinder mask 8. The flat 14 cooperates with the extension 9a of the viewfinder mask 9. Both flats 13 and 14 are staggered against one another about 120°. The arrangement is such, that the extensions 8a and 9a of the viewfinder masks come to rest on the cylindrical part of the trigger cam 11, revolving the viewfinder masks 8 and 9 against the force of the spring 16, 17, schematically shown, out of the path of rays of the viewfinder, when the wideangle supplementary objective 4 is connected in series with respect to the normal objective. The field of view of the viewfinder is limited in this position by the wideangle mask, being joined to the viewfinder objective 7.

In case that the objective turret is turned anticlockwise according to FIG. 3, the sun shield 5 gets in front of the normal objective. At the same time also the trigger cam 11 is turned, at which the flat 13 of the trigger cam 11 is opposite the extension 8a of the viewfinder mask 8. Thereby the latter is revolved by the force of the spring 16, into the path of rays of the viewfinder, an eccentric mounted pin 18 determining its exact position. As clearly shown in FIG. 1, the extension 8a is now lifted up from the trigger cam, so that eventual inaccuracies in manufacturing the trigger cam or the viewfinder mask do not influence their adjustment.

On a further turning of the turret 2 the viewfinder mask 8 is revolved again out of the path of rays by the trigger cam 11, while the viewfinder mask 9, indicating the field of view of the telephoto objective, enters into the path of rays. The exact position of the mask 9 is determined by the adjustably, eccentric mounted pin 19. Recesses 20 and 21 of the viewfinder masks assure that the latter only gets in contact with the adjusting pin 18 and 19 respectively, being co-ordinated to them. The pins 18 and 19 are mounted in borings of the front plate, being blocked by rings 22, 23. The pins 18 and 19 at their part being accessible from outside show slots 24, 25, permitting after mounting the front plate the adjustment of the viewfinder masks for example by a screw-driver. After that the pins 18 and 19 are blocked in their position for example by lacquer.

The invention is not restricted to the illustrated example, there are numerous variations possible, without departing from the scope of the invention. So for example the viewfinder masks can be arranged in a common carrier, being mounted swingably or movably in the camera casing. Instead of a revolving objective turret also so-called objective slides, that means longitudinal movable objective carriers can be provided. The objective carriers are able to carry three and more objectives and supplementary objectives respectively. On principle, however, it is possible, to arm the objective respective supplementary objective carrier only with one objective or supplementary objective respectively. In this case the camera front plate shows two and more of these carriers.

What I claim is:

1. In a camera having at least two objectives of different focal length, a viewfinder, at least one carrier movably mounted on said camera and carrying said objectives positionable selectively in operating position by optional displacement of said carrier, the improvement which comprises field changing means for the viewfinder operably controlled by moving the objective carrier comprising in combination, at least one field mask insertable into the field of view of said viewfinder suitably defining the field of view of the respective objective which is in operating position, elastic elements which engage said masks and tend to move said masks into the field of view of the viewfinder, an adjustable stop for each mask, means on the camera for automatically moving the mask out of the field of view of said viewfinder to a ready position when said carrier is displaced to move the respective objective out of the operative position and means to release the mask when said carrier is displaced to move the respective objective into said operative position, said mask being inserted into the field of view of the viewfinder by the action of the elastic element, said mask abutting the respective adjustable stop, so that the accurate position of the mask inserted into the viewfinder is defined by the respective adjustable stop.

2. A camera according to claim 1, in which the adjustable stops are eccentric pins disposed at right angles to the direction of movement of the masks.

3. A camera having at least two objectives of different focal length, a viewfinder, an objective turret carrying said objectives, a shaft mounted on the camera, said turret being revolvable around said shaft, said objectives being positionable selectively in operating position by optional revolving of said turret, a pivot pin, masks pivotally mounted on said pivot pin and turnable into the field of view of said viewfinder suitably defining the field of view, cam discs connected with the objective turret and cooperating with said masks, elastic elements which engage said masks and tend to turn said masks into the field of view of the viewfinder, an adjustable stop for each mask, said cam discs turning the masks out of the field of view of said viewfinder to a ready position when said turret is revolved to move the respective objective out of the operative position, said cam discs releasing the mask when said turret is revolved to move the respective objective into the operative position, said mask being turned into the field of view of the viewfinder by the action of the elastic element, said mask abutting the respective adjustable stop, so that the accurate position of the mask inserted into the viewfinder is defined by the respective adjustable stop.

4. A camera according to claim 3, in which said cam discs are cylindrical rotatable members having axially extending flats angularly spaced and disposed for allowing angular displacement of said masks by said elastic members into positions in which the masks are inserted into the field of view of said viewfinder and abutting said adjustable stops, said flats being of sufficient depth to allow disengagement of the masks and the cylindrical members, so that the elastic means hold the masks against said stops free of interference by said cylindrical members.

5. A camera according to claim 3, in which the adjustable stops are eccentric pins disposed parallel to the pivot pin of the masks.

References Cited in the file of this patent
UNITED STATES PATENTS
2,917,968    Nojiri _____ Dec. 22, 1959